Nov. 6, 1928.
M. M. EPPSTEIN
1,690,777
GLASS DELIVERY APPARATUS
Filed Aug. 24, 1926
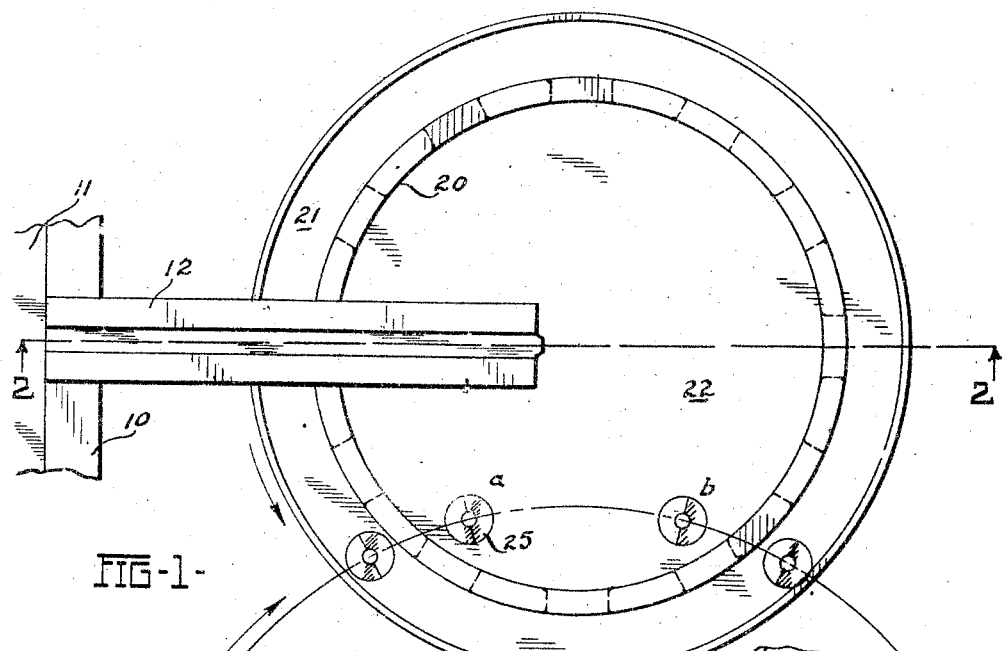
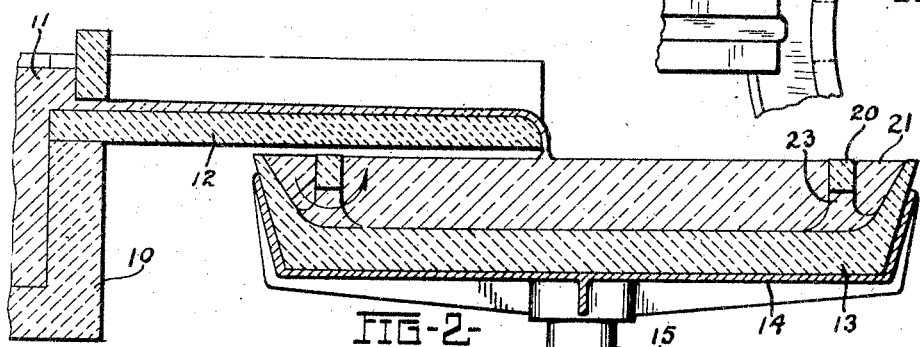
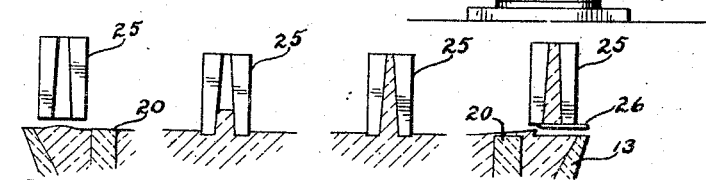
INVENTOR
Meyer M. Eppstein
By J. F. Rule
His attorney Patented Nov. 6, 1928.

1,690,777

UNITED STATES PATENT OFFICE.

MEYER M. EPPSTEIN, OF CHARLESTON, WEST VIRGINIA, ASSIGNOR TO THE OWENS BOTTLE COMPANY, OF TOLEDO, OHIO, A CORPORATION OF OHIO.

GLASS-DELIVERY APPARATUS.

Application filed August 24, 1926. Serial No 131,183.

My invention relates to improvements in glass delivery apparatus and particularly to revolving tank construction.

In gathering of glass from a revolving tank such as that commonly used with the well-known Owens suction type forming machine, the gathering or blank molds periodically dip into the molten glass contained in the revolving tank, sweep across the gathering area and at a given station are lifted away from said glass. At this station, and just before the blank mold reaches the peripheral wall of the revolving tank, a cut-off is actuated to sever the string or tail of glass which extends from the body of glass in the tank to the lower end of the charge which has been gathered into the blank mold cavity. These stringy portions are chilled by the mold and the cut-off and drop onto the surface of the molten glass in the tank. In dropping upon the glass surface, these chilled portions trap air and consequently form bubbles or blisters. Because of the chilled condition of the portions deposited upon the glass in the tank, the air trapped does not readily escape, the result being that the tank may make several complete revolutions before the chilled portions have become completely reheated and reassimilated and before the trapped air can escape. Many of these bubbles or blisters, therefore, return to the gathering area and are gathered into the blank molds, causing weakness and defects in the finished ware.

Where single molds are being used, gathering of these chilled portions and trapped air may be materially decreased by changing the operating speed of the forming machine from time to time so that the points at which the molds dip into the glass are changed. In recent years, multiple cavity molds have come into use, with the result that additional stringy portions are present and the blister formation is considerably aggravated. The speed changing method above suggested has very little effect where multiple cavity molds are operating. The outstanding objection to the formation of these bubbles or blisters, particularly where plural molds are being used, is, that on account of the blisters being just beneath or practically upon the surface of the glass, they are usually drawn to the upper end of the mold cavity and lodge in that portion which ultimately forms the neck or lip of the bottle or other ware. The presence of blisters or bubbles in the body of the ware ordinarily is not so objectionable, except as regards appearance, but where the bubbles are located in the neck portion or lip of the bottle or other ware, they form a real defect which materially weakens the structure.

An object of the present invention is to provide means whereby the chilled stringy portions which are cut from charges drawn into the blank molds, will be forced to move beneath the surface of the glass in the revolving pot and become reheated and reassimilated before returning to the area from which charges are gathered, and thereby eliminate the noted objections.

A further object is to provide means for delivering molten glass directly to a compartment of the revolving pot, from which the charges are gathered and arranging a separate compartment to trap the chilled portions, to further insure gathering of glass free of chilled streaks or bubbles.

Other objects will be apparent hereinafter.

In the accompanying drawings:

Figure 1 is a plan view illustrating my improved type of revolving pot and its association with a refining tank.

Figure 2 is a sectional view taken on the line II—II of Figure 1.

Figure 3 is a part sectional elevation showing a blank mold just about to enter the gathering area of a revolving pot.

Figure 4 is a similar view showing a blank mold with its charge partially gathered.

Figure 5 illustrates a blank mold with its charge completely gathered.

Figure 6 is a detail view showing the manner in which the cut-off causes deposit of the chilled portion or tail of glass in a separate annular channel surrounding the compartment from which charges are gathered.

Figure 7 illustrates a form of my invention wherein fresh glass is delivered to the outer compartment of the revolving tank.

In the accompanying drawings, I have illustrated my improved type of revolving tank or pot in conjunction with a refining tank 10, containing molten glass 11 which issues through an opening in one side wall and is conducted to the revolving tank by means of a spout or trough 12. This trough may be of different lengths as will be hereinafter set forth. The revolving tank may be mounted for rotation in the usual or any preferred manner. In the present case, the revolving tank comprises a circular basin or body 13 of suitable refractory material, supported in a metal casing or shell 14 mounted upon the upper end of a vertical shaft 15. This shaft is rotated by any suitable means through gears 16, as shown in Figure 2.

According to the present invention, the revolving tank is divided into two compartments, one of which provides a gathering area from which charges of glass are periodically gathered by the usual blank molds 25. The other compartment is so arranged that it catches the chilled portions of glass which are ordinarily deposited on the gathering area upon completion of the gathering period and actuation of the cut-off. In providing these separate compartments, an annular upstanding dividing wall 20 is formed upon the bottom of the tank 13, the upper surface of said wall terminating in substantially the same plane with the peripheral wall and spaced inwardly from the latter. Thus, there is provided an annular channel-like compartment 21 which completely encircles the inner compartment 22. Communication between these two compartments is provided by forming a series of circumferentially spaced openings 23 in the lower portion of the annular wall 20. Because of this particular location of the openings 23, material passing from one compartment to the other, must necessarily pass beneath the surface of the material contained in the tank when the tank is being operated.

In one form of my invention, a relatively long delivery trough or spout 12 is employed to convey molten glass from the refining tank 10 to the revolving tank. Utilization of a long trough whose discharge end terminates between the annular dividing wall 20 and the axis of the revolving tank, permits feeding of fresh molten glass direct to the inner compartment 22 of the revolving tank in proximity of the gathering area.

The operation of the apparatus may be stated as follows:

The revolving tank is continuously moving, as is the usual practice, and the blank molds 25 of a forming machine are periodically and successively brought into charge gathering contact with the surface of the molten glass contained within the gathering compartment 22. As is noted in Figure 1 and Figures 3 to 6, inclusive, a blank mold 25 in approaching the gathering area and while over the annular channel 21, is spaced above the surface of the molten glass. Just after the blank mold passes the annular dividing wall 20, said mold dips into the molten glass at substantially the point "a" (see Fig. 1) and sweeps across the gathering area to the point "b". At the point "b", the blank mold is lifted out of contact with the glass in the gathering area and as the mold passes over the annular dividing wall 20, the usual cut-off 26 is actuated to sever the stringy portion or tail from the lower end of the gathered charge which has been drawn into the blank mold. The movement of the blank mold and actuation of the cut-off are so relatively timed that these stringy portions are deposited in the annular channel 21 which surrounds the compartment 22. The glass in the revolving tank will naturally seek a common level, thereby causing circulation to a greater or less degree through the openings in the dividing wall 20. The result is that these chilled portions which are deposited upon the surface of the glass in said annular compartment or channel are forced to pass beneath the glass surface and through the openings 23 before returning to the gathering area. Thus, said chilled portions are completely reheated and reassimilated and all bubbles eliminated from the gathering area, thereby insuring gathering of good glass into each and every blank mold coming into contact with the gathering area.

Under certain conditions, it may be preferable to deliver the fresh glass from the refining tank directly to the annular channel or compartment 21. Such delivery of fresh hot glass to this channel, serves to quickly reheat and reassimilate the chilled portions of glass which have been deposited in said channel by the cut-off heretofore described. Figure 7 illustrates the association of the delivery spout or trough and the revolving tank where the fresh glass is to be delivered directly to the annular channel or compartment 21, instead of to the inner compartment.

Manifestly, certain changes in the minor details of construction may be resorted to as may fall within the spirit and scope of the invention as claimed.

What I claim is:

1. A revolving tank to contain molten glass, including, a compartment from which charges are gathered, a compartment surrounding the first named compartment to receive portions of glass severed from charges gathered in the inner compartment, and means for causing a reheating and transferring of the chilled portions from the outer to the inner compartment.

2. In combination, a revolving tank to contain molten glass, including an inner compartment providing a charge gathering area, an outer compartment surrounding the inner compartment, a blank mold, means for moving said mold in substantially a horizontal plane to gather a charge from said gathering area, and means operable to lift the mold at a given station and deposit excess glass in the outer compartment.

3. In combination, a revolving tank to contain molten glass, including an inner compartment providing a charge gathering area, an outer compartment surrounding the inner compartment, a blank mold, means for moving said mold in substantially a horizontal plane to gather a charge from said gathering area, means for elevating the blank mold at a given station, and a cut-off operable to sever and deposit excess glass in the outer compartment.

4. The combination of a gathering tank to contain molten glass, molds moving over said tank and dipping into the glass to gather charges by suction, means for severing the glass extending downward from a mold after a charge is gathered and the mold lifted from the gathering surface, permitting said severed glass to drop back into the tank, and an obstruction interposed between the gathering area and the area of the tank into which the severed glass is dropped.

5. The combination of a gathering tank to contain molten glass, molds moving over said tank and dipping into the glass to gather charges by suction, means for severing the glass extending downward from a mold after a charge is gathered and the mold lifted from the gathering surface, permitting said severed glass to drop back into the tank, and a wall interposed between the gathering area and the surface of glass into which severed glass is dropped, said wall being provided with a submerged opening through which the severed portions may return to the gathering area.

6. The combination of a container for molten glass having separate compartments, molds traveling in a predetermined path over said container and dipping into the glass in one compartment for gathering by suction, and means for severing from the mold the glass depending therefrom after the mold has gathered its charge and passed beyond the gathering area, said parts being arranged to permit the severed glass to drop into the other compartment.

7. The combination of a tank to contain molten glass comprising separate compartments, molds arranged to travel over the tank, dip into the glass in one compartment and gather by suction, and means for severing from the mold the glass depending therefrom after the gathering operation and causing the severed glass to drop into the other compartment.

8. The combination of a tank to contain molten glass comprising separate compartments, molds arranged to travel over the tank, dip into the glass in one compartment and gather by suction, means for severing from the mold the glass depending therefrom after the gathering operation and causing the severed glass to drop into the other compartment, and means for continuously feeding molten glass into one of said compartments.

9. The combination of a tank to contain molten glass comprising separate compartments, molds arranged to travel over the tank, dip into the glass in one compartment and gather by suction, means for severing from the mold the glass depending therefrom after the gathering operation and causing the severed glass to drop into the other compartment, and means providing communication between said compartments beneath the surface of the glass therein.

10. The combination of a container for molten glass, molds traveling over the glass in the container and arranged to dip and gather by suction and then lift away from the glass, means for severing the tail of glass depending from the mold, and means for causing said severed tail of glass to be moved beneath the surface of the body of glass in the container and thereby reheated and reassimilated before being brought to position to be gathered into a succeeding mold.

11. The combination of a container for molten glass, a wall therein dividing the container into separate compartments, said wall formed with a submerged opening providing communication between the compartments, molds operable to gather charges of glass from one compartment, and means for severing tails of glass depending from the molds after the gathering operation and dropping said tails into the other compartment.

12. The combination of a container for molten glass, a wall therein dividing the container into separate compartments, said wall formed with a submerged opening providing communication between the compartments, molds operable to gather charges of glass from one compartment, means for severing tails of glass depending from the molds after the gathering operation and dropping said tails into the other compartment, means for continuously rotating said container, and means for continuously supplying molten glass to one of said compartments.

13. The combination of a revolving tank to contain molten glass, including an inner compartment and an outer compartment surrounding the inner compartment, and means for gathering charges of glass from the inner compartment and delivering to the outer compartment, portions of glass severed from said charges.

14. The combination with a revolving tank for molten glass having an inner compartment, a second compartment, and an annular upstanding wall separating said compartments, said wall having a series of submerged openings forming communication between said compartments, of a glass forming machine comprising molds dipping into and gathering charges of glass from said inner compartment and delivering to the other compartment, portions of glass chilled by the gathering operation.

15. The combination of a revolving tank having inner and outer compartments, means forming communication between the compartments below the glass surface, means for delivering molten glass to the tank, and a glass forming machine comprising molds dipping into and gathering charges of glass from said inner compartment and delivering to the other compartment, portions of glass chilled by the gathering operation.

16. The combination of a revolving tank having inner and outer compartments, means forming communication between the compartments below the glass surface, means for delivering molten glass to the tank, comprising a trough having its discharge end disposed over the inner compartment, means for gathering charges of glass from one of said compartments, and means for delivering to the other of said compartments, portions of glass chilled by said gathering operation.

17. The combination of a revolving tank having inner and outer compartments, means for delivering molten glass to the tank, an annular upstanding wall dividing said compartments, said wall having a submerged opening providing communication between said compartments, means for gathering charges of glass from one of said compartments, and means for delivering to the other of said compartments, portions of glass chilled by said gathering operation.

18. The combination of a revolving tank having inner and outer compartments, means for delivering molten glass to the tank, an annular upstanding wall dividing said compartments, said wall having an annular series of submerged transverse openings forming communication between said compartments, means for gathering mold charges of glass from the inner compartment, and means for delivering to the outer compartment, portions of glass chilled by said gathering operation.

19. The combination of means for causing a circulation or movement of a mass of molten glass by which portions thereof are repeatedly moved past a surface gathering area, and means for causing surface portions of the glass which have been chilled, to be carried beneath the surface of the glass and reheated before again being brought to the gathering area.

Signed at Charleston, in the county of Kanawha and State of West Virginia, this 20th day of August, 1926.

MEYER M. EPPSTEIN.